United States Patent Office 2,993,855
Patented July 25, 1961

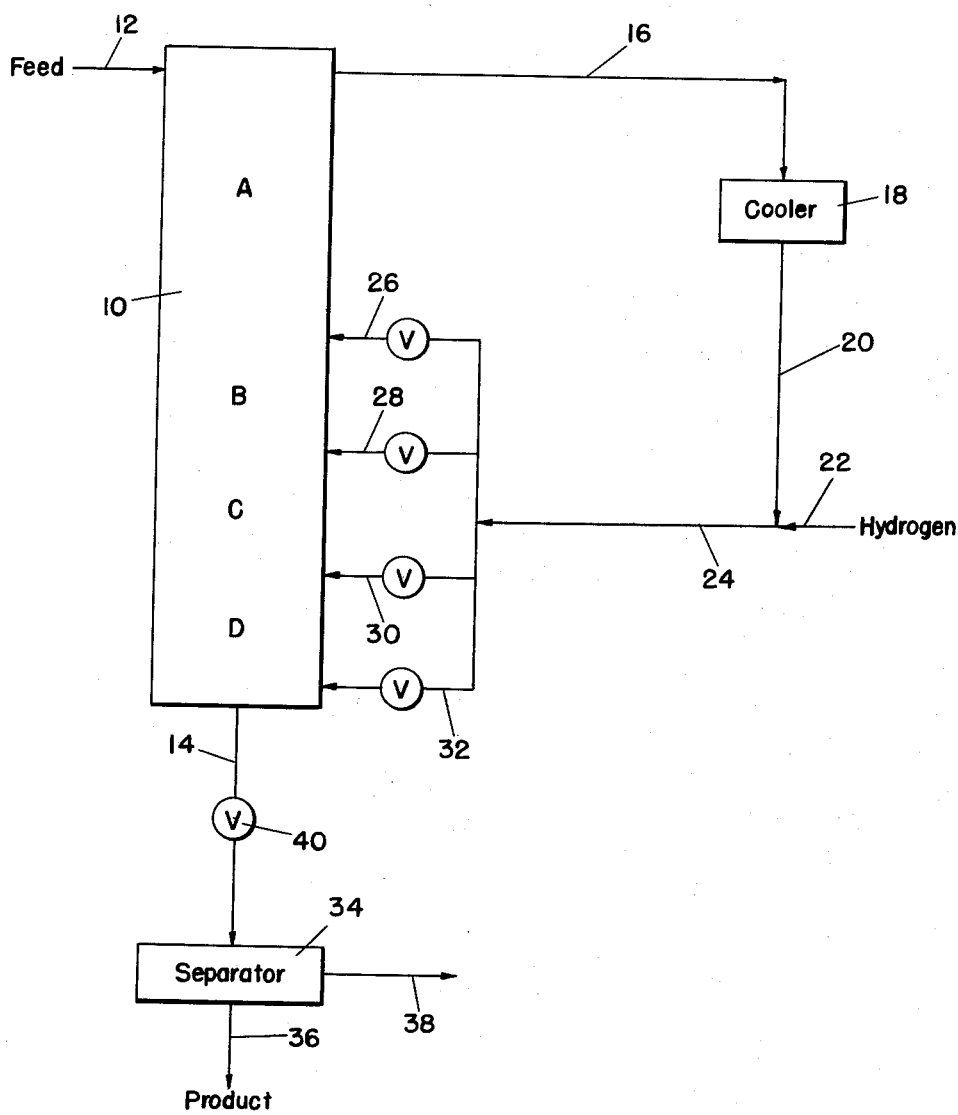

2,993,855
HYDROGENATION OF HYDROCARBONS WITH A FIXED CATALYST BED, AND THE RECYCLING OF HYDROGEN AT SPACED POINTS FOR TEMPERATURE CONTROL
James Van Dyck Fear, Media, Pa., assignor to Sun Oil Company, Philadelphia, Pa., a corporation of New Jersey
Filed July 24, 1958, Ser. No. 750,697
6 Claims. (Cl. 208—143)

This invention relates to hydrogenation processes, and more particularly to an improved manner of conducting processes wherein hydrocarbon material is contacted with a stationary bed of solid hydrogenation catalyst in the presence of hydrogen.

It is known in the art to contact hydrocarbon materials with hydrogen in the presence of a catalyst by passing the hydrogen and hydrocarbon material through a stationary bed of solid catalyst. In such processes, as the amount of hydrocarbon which has been contacted with the bed increases, the catalyst gradually declines in activity. This effect is at least partially a result of the fact that the desired hydrogenation and other reactions often require the use of temperatures high enough to also cause decomposition reactions resulting in the formation of deactivating carbonaceous contaminants. In order to maintain the desired extent of hydrogenation as the catalyst activity declines, it is often desirable to increase the amount of catalyst in the hydrogenation zone so that the decreased activity is compensated by the increased amount of catalyst.

The present invention provides a novel and superior manner of accomplishing this function, utilizing the hydrogen stream as a means of changing the effective size of the hydrogenation zone as the amount of hydrocarbon contacted with the catalyst increases.

The invention will be further described with reference to the attached drawing, which is a schematic illustration of the process according to one embodiment of the invention.

Referring to the drawing, solid granular hydrogenation catalyst having size, for example, within the approximate range from 4 to 10 mesh, is disposed in a stationary bed filling the vessel 10. A hydrocarbon charge stock is introduced through line 12 into the top of the vessel 10 and passes downwardly in liquid phase through the catalyst bed. During such passage, the hydrocarbon material comes in contact with hydrogen passing upwardly through the bed, and components of the charge stock are hydrogenated. The hydrogenated product is withdrawn through line 14 from the bottom of vessel 10. If desired, this product may be passed in indirect heat exchange with the charge stock in line 12 prior to introduction of the latter into vessel 10.

In the early stages of the process, the catalyst in vessel 10 is at a high level of activity, and this level declines as the process continues, as a result of factors including decomposition of constituents of the charge stock to form carbonaceous deposits. In the early stages, before the decline in activity has occurred to a predetermined extent, the hydrogen-containing gaseous material which is passed upwardly countercurrent to the hydrocarbon material, is introduced into vessel 10 through lines 24 and 26. This gaseous material is at a lower temperature than the hydrocarbon material as the latter approaches the level of the inlet 26, and consequently the contact of the gaseous material with the hydrocarbon material results in cooling of the latter. The extent of the cooling is such that as the hydrocarbon material passes downwardly through section B of vessel 10, the lowered temperature reduces the decomposition reactions which occur in section B as compared with section A. Consequently, the deactivation of catalyst in section B is small as compared with that in section A.

Gaseous material is withdrawn from an upper portion of vessel 10 through line 16. This withdrawn material can, if desired, be passed in indirect heat exchange with the charge stock in line 12 prior to the introduction of the latter into vessel 10. Further cooling of the removed gaseous material can be provided if necessary by passing the latter through cooling zone 18, wherein it is subjected to indirect heat exchange with water for example. The cooled gaseous material is recycled through lines 20, 24 and 26 to the hydrogenation zone. Fresh hydrogen is added through line 22 to replace that which has reacted with the hydrocarbon material.

The extent of cooling of the hydrogen-containing gases prior to reintroduction into vessel 10 is sufficient to provide substantial cooling of the hydrocarbon material upon contact of the latter with the cooled gases at the approximate level of line 26. Preferably, the amount of cooling is such as to reduce the temperature of the hydrocarbon material by at least 25° F. more preferably at least 50° F. The extent of the reduction of the temperature of the gases by cooling prior to reintroduction can readily be determined by a person skilled in the art, in the light of the present specification, in order to obtain the desired temperature reduction in the hydrocarbon material.

In the first stage, the hydrogenation in zone A is sufficient to provide the necessary improvement of the charge stock. When the catalyst activity has declined to a predetermined extent, at which the extent of the hydrogenation of the charge stock in zone A is no longer sufficient, the introduction of the cooled gaseous material through line 26 is discontinued, and introduction of the cooled gaseous material through line 28 is begun. The liquid hydrocarbon material passing downwardly through the catalyst bed is now at a relatively high temperature suitable for optimum hydrogenation during its passage through section B as well as section A, and the cooling of the liquid hydrocarbon material to a temperature at which decomposition reactions are reduced, occurs as the hydrocarbon material passes from section B to section C. The amount of catalyst in the higher temperature zone has therefore been increased by the amount contained in section B, and the desired extent of hydrogenation has therefore been maintained in spite of the decrease in activity of catalyst in section A. Since in the earlier stage when the higher temperature hydrogenation zone was limited to section A, the catalyst in section B was not subjected to the higher temperatures promoting conversion, the latter catalyst did not become deactivated as did the catalyst in section A. Consequently, when the catalyst in section B was added to the hydrogenation zone, it was available at a higher level of activity than the catalyst in section A.

As the process continues further, the catalyst activity declines further, and it becomes necessary to add the catalyst in section C to the higher temperature hydrogenation zone. This is accomplished by discontinuing introduction of cooled gases through line 28 and beginning introduction of cooled gases through line 30. Since the catalyst in section C has undergone only very slight deactivation in the prior stages, it is added to the hydrogenation zone at a higher level of activity than the catalyst in sections A and B, and the desired extent of hydrogenation is maintained.

In the final stage, the catalyst in section D is added, for the purpose of the desired hydrogenation reactions, to that in sections A, B and C by introducing cooled gases through line 32 rather than line 30. The catalyst in section D is added at a higher level of activity than in the other sections, and the desired extent of hydrogenation is maintained.

Throughout the operation as described above, the gaseous material is removed from vessel 10 through line 16 and cooled in zone 18 prior to reintroduction into the vessel 10, and make-up hydrogen is added through line 22. After reduction in pressure by passage through pressure reducing valve 40, gaseous materials are separated from the hydrocarbon product in zone 34 and removed through line 38, hydrocarbon product being withdrawn through line 36.

When all of the catalyst in vessel 10 has become deactivated to an extent such that the desired conversion is not obtained, the introduction of charge stock is discontinued and the catalyst is discarded and replaced, or regenerated by suitable conventional means. The fresh or regenerated catalyst is then contacted with charge stock again in the manner described previously, the cooled gases being introduced through line 26. The above described procedure is then repeated.

In the operation according to the invention, usually no hydrogen is introduced at the lower end of vessel 10 except during the last stage of the operation. In the prior stages, all of the hydrogen which is employed in the process is introduced at the various intermediate levels, such as the levels of lines 26, 28 and 30.

It is essential, according to the invention, that the hydrocarbon charge stock be passed downwardly through the reaction zone. The results according to the invention cannot be obtained with passage of the charge stock upwardly through the hydrogenation zone.

The following example illustrates the invention.

The charge stock is a distillate from Mid-Continent crude petroleum, which distillate has been furfural refined and dewaxed, and has a boiling range of 600° F. to 820° F., Saybolt Universal viscosities at 100° F. of 100 seconds and at 210° F. of 39 seconds, and API gravity of 33. The sulfur content is 0.1% and the aromatics content 12%.

The hydrogenation catalyst comprises 12.5% cobalt molybdate on alumina. This catalyst is disposed in a hydrogenation zone in the manner shown in the drawing, and the charge stock and hydrogen are introduced into the hydrogenation zone in the manner illustrated in the drawing.

The pressure in vessel 10 is 800 p.s.i.g., and the charge stock is passed through vessel 10 at a liquid hourly space velocity of 1, based on the entire vessel 10. The charge stock is preheated to 675° F. and introduced at that temperature into vessel 10. Since the hydrogenation reactions are exothermic, the liquid temperature may increase somewhat as the liquid descends through the upper part of the bed. Hydrogen-containing gases are introduced at a temperature of 225° F. through line 26.

The hydrogen consumption in section A is about 30 standard cubic feet per barrel of charge stock and the hydrogenation of constituents of the latter results in an increased hydrogen-to-carbon ratio and a decreased refractive index of the product over the charged stock. The hydrogen consumption in the lower sections is very much lower, because of the reduced temperature.

The gases withdrawn from vessel 10 are cooled to 400° F. by indirect heat exchange with the charge stock and by additional cooling in zone 18. The cooled gases are recycled through line 26 at a rate of about 1140 standard cubic feet per barrel of charge.

As a result of the contact with the cooled gases, the temperature of the liquid hydrocarbon material directly below the level of line 26 is about 625° F. As a result of this lower temperature, decomposition reactions during passage through sections B, C and D are greatly reduced as compared with those in section A.

After 100 days of operation as described, the activity of the catalyst in section A decreases to an extent such that insufficient hydrogenation occurs. The level of introduction of the cooled hydrogen-containing gases is then lowered from line 26 to line 28, and the operation is continued at conditions otherwise the same. The cooled gases reduce the temperature of the liquid hydrocarbon material to about the same extent as in the earlier stage.

When necessary, the level of introduction of the cooled gases is lowered to line 30 and later to line 32, the conditions being otherwise the same except for the increase in the effective size of the hydrogenation zone.

The process according to the invention is generally useful in known processes for subjection of hydrocarbon materials to hydrogenation conditions. Any suitable known charge stock can be employed, such as crude petroleum, reduced crude, lubricating oils, waxes, gasoline fractions, etc. Coal tar fractions, shale oil fractions, etc. can also be employed as charge stocks.

In the above example, the hydrogenation of constituents of the lubricating oil resulted in a product which, when inhibited against oxidation by addition of a small amount, e.g. 0.5%, of an oxidation inhibitor such as 2,6-ditertiary butyl p-cresol, had greater oxidation stability than that of the charge stock containing the same amount of the same inhibitor. Such hydrogenation of lubricating oil to improve its oxidation inhibitor response is one example of known hydrogenation process to which the invention can be applied. However, a person skilled in the art will recognize the applicability of the invention to many other known hydrogenation processes.

Any suitable known hydrogenation conditions can be employed. Usually the temperature will be within the approximate range from 400° F. to 1,000° F., preferably 650° F. to 800° F., the pressure within the approximate range from 100 p.s.i.g. to 5,000 p.s.i.g., and the liquid hourly space velocity within the approximate range from 0.1 to 20.

Usually, a 25 or 50° F. cooling of the liquid hydrocarbon by contact with the hydrogen-containing gases decreases the extent of deactivation sufficiently, at any level of hydrogenation temperature, to derive a positive benefit from the process according to the invention. The decrease in deactivation is particularly pronounced when the temperature is reduced by the cooling from a temperature above 650° F. to one below 650° F. Usually, the extent of the cooling will not exceed a 100° F. gradient, since otherwise the amount of gas required to be contacted with the liquid is quite high. However, greater extents of cooling, e.g. up to 200° F. or higher, are in themselves advantageous and may be beneficially employed in cases where it is feasible to use the large amounts of gas needed to provide the greater gradient.

Any suitable hydrogenation catalyst can be employed in the process according to the invention, e.g. cobalt, molybdenum, platinum, iron, nickel, oxides or sulfides of such metals, etc. Any suitable carrier for the catalyst can be employed, e.g. silica gel, alumina, bauxite, clay etc.

The invention claimed is:

1. Process for hydrogenating constituents of hydrocarbon mixtures which comprises introducing a hydrocarbon mixture in liquid phase into a bed of granular solid hydrogenation catalyst, passing the hydrocarbon mixture downwardly in liquid phase through the bed, passing hydrogen-containing gases into the bed at a level above the lower end thereof, whereby the hydrocarbon mixture is cooled by said gases, maintaining a relatively high temperature in the hydrocarbon mixture in an upper zone above said level, passing the hydrogen-containing gases upwardly through the upper zone countercurrent to the liquid hydrocarbon mixture whereby hydrogenation of constituents of the hydrocarbon mixture takes place, maintaining a lowered temperature in a lower zone beneath said level, whereby decomposition reactions are reduced in said lower zone, and periodically lowering the level of the introduction of hydrogen-containing gases into the bed, thereby to increase the size of the upper zone and to decrease the size of the lower zone.

2. Process according to claim 1 wherein the hydrocarbon mixture is cooled by said gases by a temperature gradient in the range from 25 to 200° F.

3. Process according to claim 1 wherein said relatively high temperature is in the range from 650 to 800° F., and the hydrocarbon mixture is cooled by said gases to a temperature below 650° F.

4. Process according to claim 3 wherein the hydrocarbon mixture is a petroleum lubricating oil, wherein the pressure in the bed is in the range from 100 to 5000 p.s.i.g. and the liquid hourly space velocity is in the range from 0.1 to 20 volumes per volume per hour.

5. Process according to claim 1 wherein said lowered temperature is below the temperature at which the hydrocarbon mixture is introduced into the bed.

6. Process according to claim 1 wherein the hydrocarbon mixture is cooled by said gases by a temperature gradient in the range from 50 to 200° F.

References Cited in the file of this patent

UNITED STATES PATENTS

| | | |
|---|---|---|
| 1,940,649 | Russell | Dec. 19, 1933 |
| 2,303,075 | Frey | Nov. 24, 1942 |
| 2,303,118 | Frey | Nov. 24, 1942 |
| 2,332,572 | Hepp et al. | Oct. 26, 1943 |
| 2,481,921 | Gwynn | Sept. 13, 1949 |
| 2,762,819 | Bollens | Sept. 11, 1956 |
| 2,918,425 | Berger et al. | Dec. 22, 1959 |